US011179788B2

(12) United States Patent
Schmezer

(10) Patent No.: US 11,179,788 B2
(45) Date of Patent: Nov. 23, 2021

(54) METHOD FOR PRODUCING A REMOVAL OF MATERIAL ON A TOOTH END EDGE AND DEVICE DESIGNED THEREFOR

(71) Applicant: GLEASON-PFAUTER MASCHINENFABRIK GMBH, Ludwigsburg (DE)

(72) Inventor: Ralf Schmezer, Ludwigsburg (DE)

(73) Assignee: GLEASON-PFAUTEF MASCHINENFABRIK GMBH, Ludwigsburg (DE)

( * ) Notice: Subject to any disclaimer, the term of this patent is extended or adjusted under 35 U.S.C. 154(b) by 558 days.

(21) Appl. No.: 16/083,653

(22) PCT Filed: Apr. 3, 2017

(86) PCT No.: PCT/EP2017/000418
§ 371 (c)(1),
(2) Date: Sep. 10, 2018

(87) PCT Pub. No.: WO2017/174187
PCT Pub. Date: Oct. 12, 2017

(65) Prior Publication Data
US 2019/0076945 A1    Mar. 14, 2019

(30) Foreign Application Priority Data

Apr. 5, 2016  (DE) .......................... 102016004112.9

(51) Int. Cl.
*B23F 19/12*     (2006.01)
*B23F 21/00*     (2006.01)
(Continued)

(52) U.S. Cl.
CPC ............ *B23F 19/125* (2013.01); *B23F 19/10* (2013.01); *B23F 21/005* (2013.01); *B23F 21/026* (2013.01)

(58) Field of Classification Search
CPC ...... B23F 19/125; B23F 19/10; B23F 21/005; B23F 21/026
See application file for complete search history.

(56) References Cited

U.S. PATENT DOCUMENTS 5,823,857 A * 10/1998 Tan ....................... B24B 53/075
451/47
6,077,150 A   6/2000 Jankowski
(Continued)

FOREIGN PATENT DOCUMENTS

DE         10211129 A1    10/2003
DE    102009019433 A1    11/2010
(Continued)

OTHER PUBLICATIONS

International Search Report and Written Opinion for PCT/EP2017/000418, ISA/EPO, dated Jul. 11, 2017, 11 pgs.
(Continued)

*Primary Examiner* — Lawrence Averick
(74) *Attorney, Agent, or Firm* — Robert L. McDowell

(57) ABSTRACT

The invention relates to a method for producing a removal of material on a tooth end edge of a workpiece toothing with a rotationally driven chamfering tool in a machining operation brought about by controlled axial machine movements between the chamfering tool and the likewise rotationally driven workpiece toothing, wherein material is removed with a geometrically undefined cutting edge and the removal takes place in a coordinated action between a profiling, in particular, an alterable profiling, of the chamfering tool and a machine control used for the machining operation, performed in dependence on predetermined parameters that are characteristic of the removal of material to be produced.

9 Claims, 5 Drawing Sheets

Figure 1:
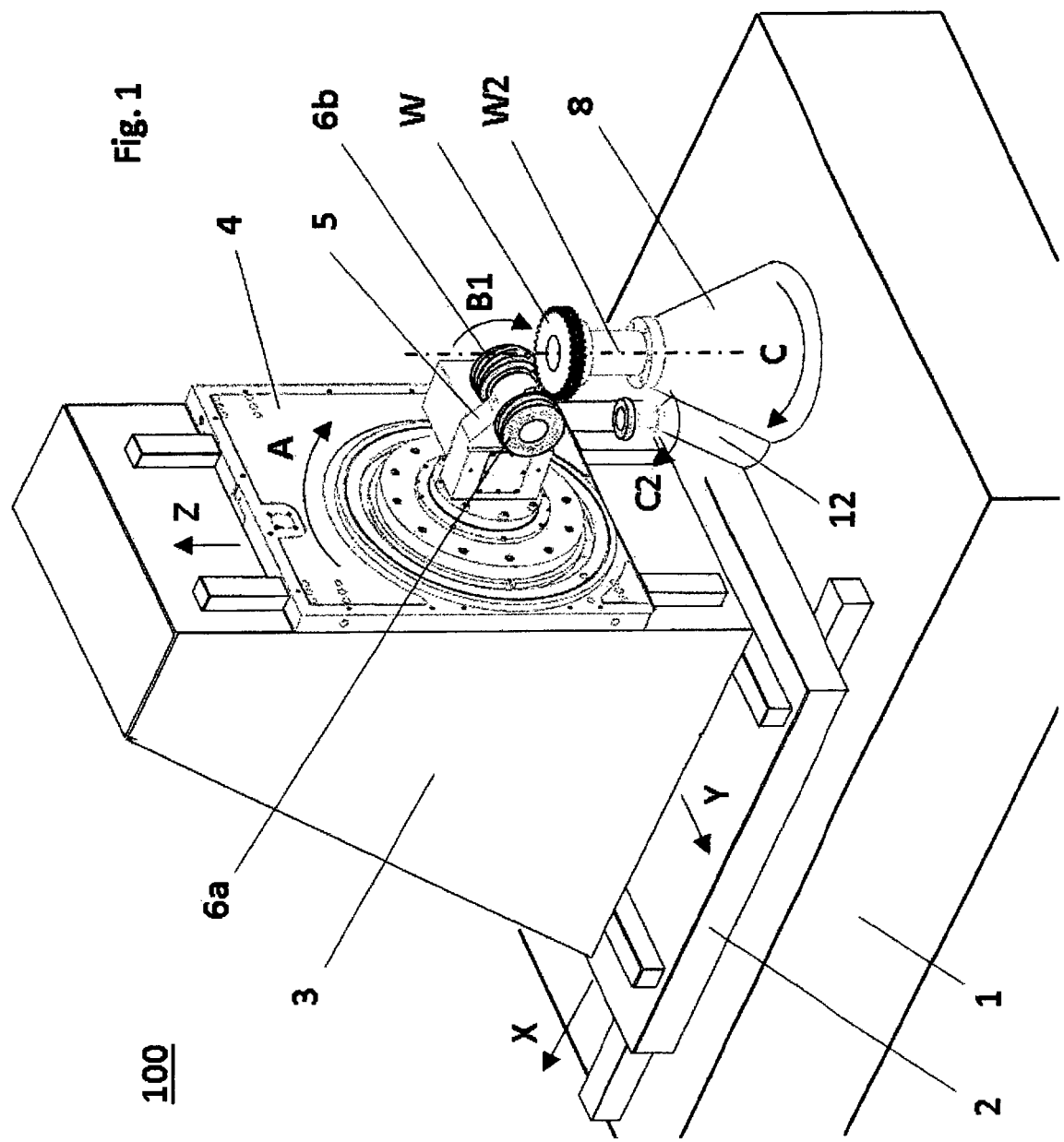

(51) Int. Cl.
      *B23F 21/02*       (2006.01)
      *B23F 19/10*       (2006.01)

(56) References Cited

U.S. PATENT DOCUMENTS

| | | | |
|---|---|---|---|
| 7,103,973 B2 * | 9/2006 | Wolff | B23F 19/10 |
| | | | 29/893.35 |
| 9,399,279 B2 * | 7/2016 | Breith | B23F 21/005 |
| 2005/0000072 A1 * | 1/2005 | Wolff | B23F 19/10 |
| | | | 29/56.5 |
| 2015/0011142 A1 * | 1/2015 | Breith | B24B 53/075 |
| | | | 451/56 |

FOREIGN PATENT DOCUMENTS

| | | |
|---|---|---|
| DE | 102011103216 A1 | 12/2012 |
| DE | 102013015240 A1 | 10/2014 |
| EP | 1270127 A1 | 1/2003 |
| EP | 1312445 A1 | 5/2003 |
| EP | 1495824 B1 | 9/2010 |
| EP | 2823942 A2 | 1/2015 |
| GB | 2292329 A | 2/1996 |

OTHER PUBLICATIONS

Search Report from German Patent and Trademark Office for DE 102016004112.9, dated Jan. 24, 2017, 14 pgs.
International Search Report and Written Opinion for PCT/EP2017/000418, ISA/EPO, dated Jul. 11, 2017, 12 pgs.

\* cited by examiner

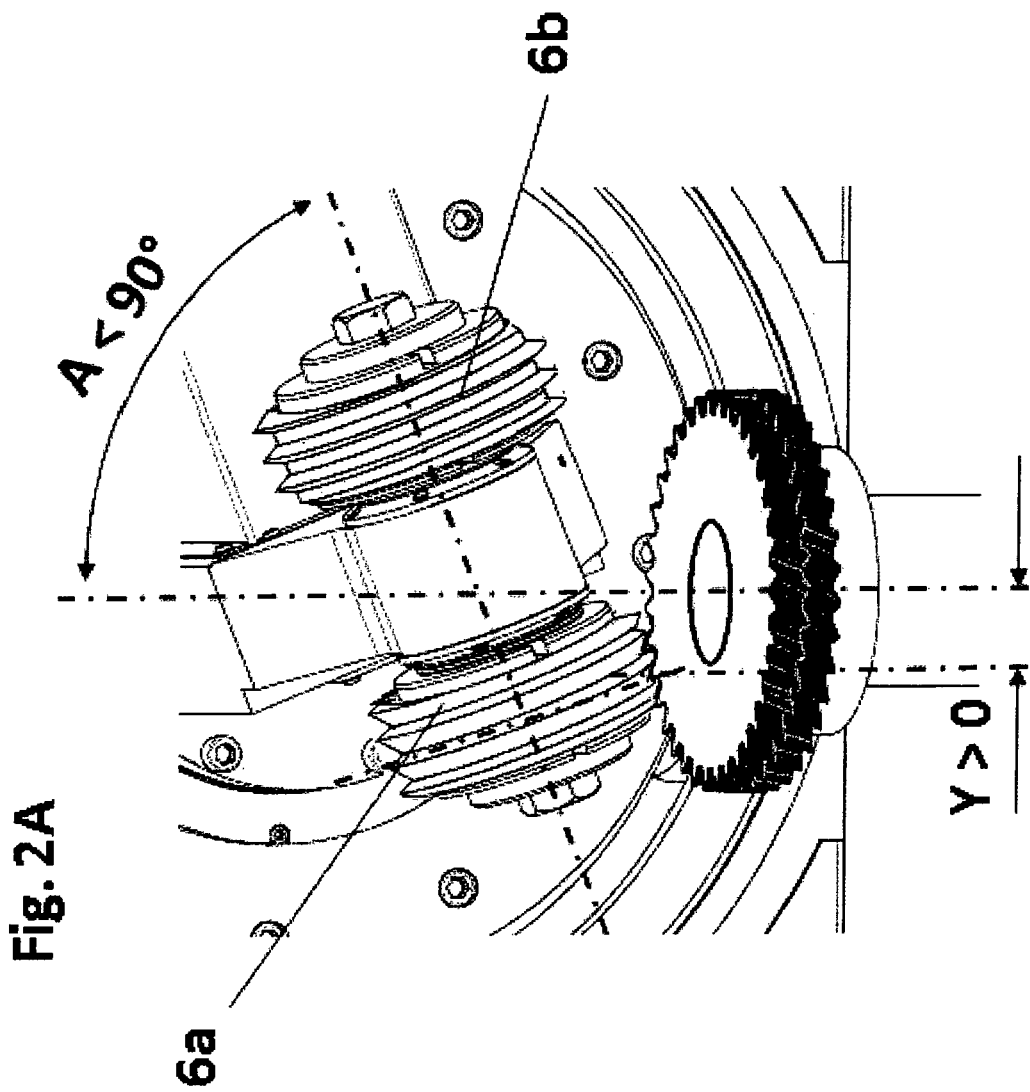

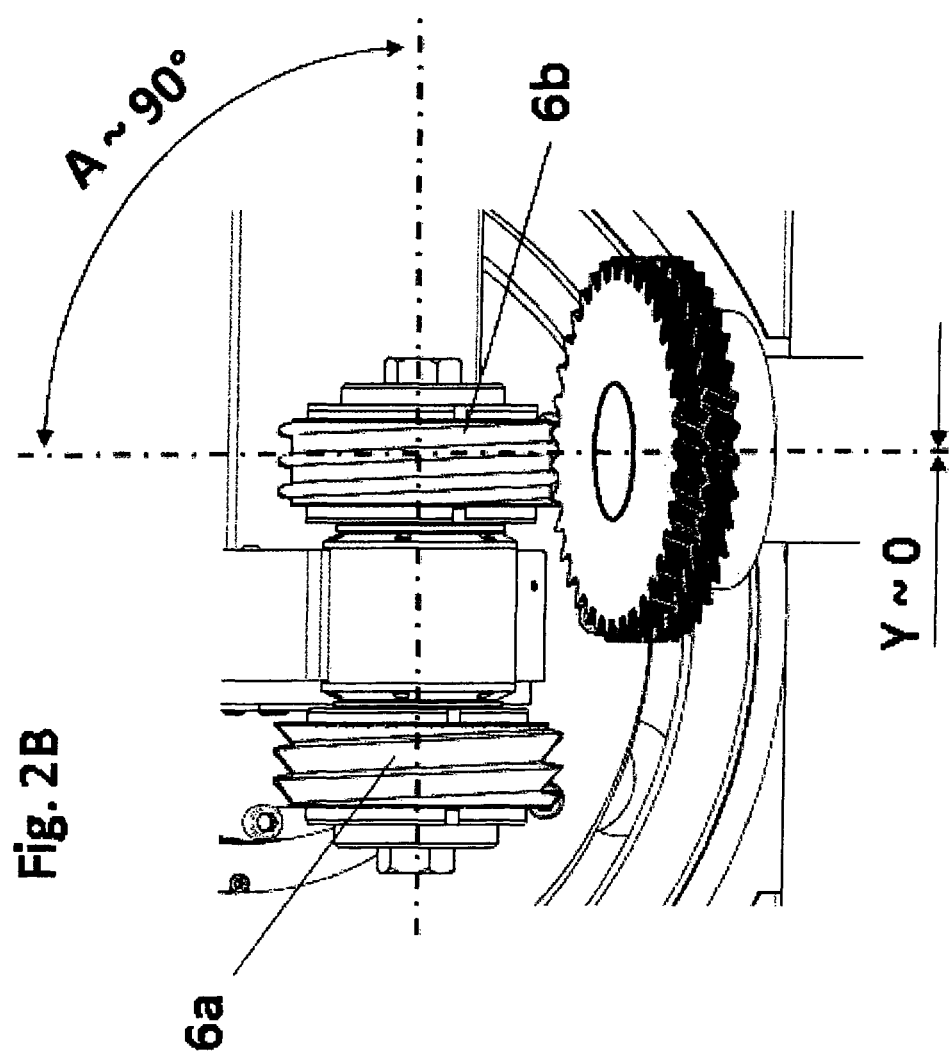

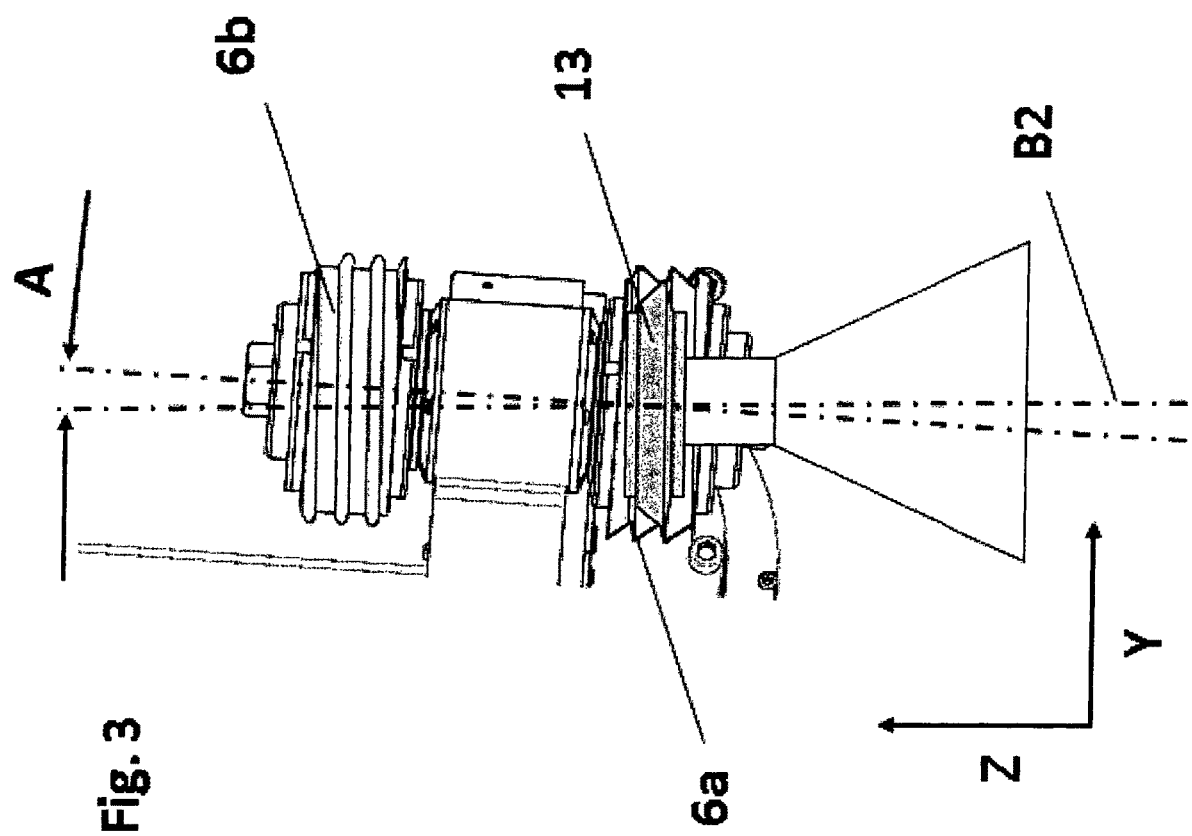

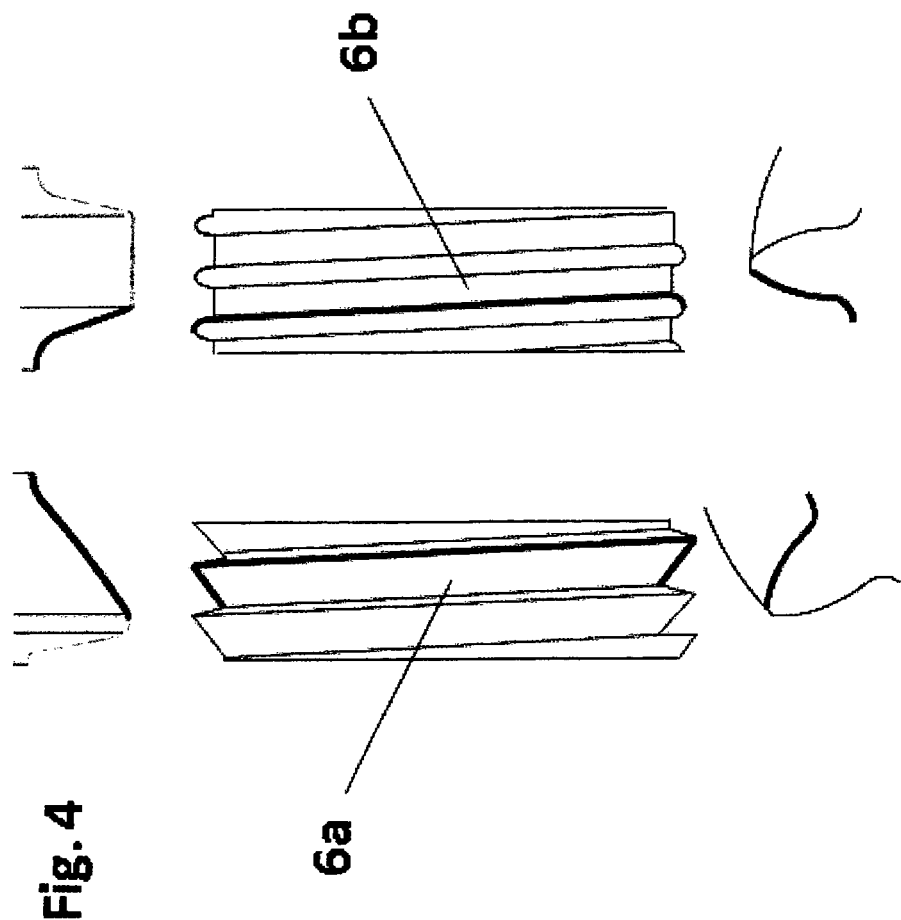

METHOD FOR PRODUCING A REMOVAL OF MATERIAL ON A TOOTH END EDGE AND DEVICE DESIGNED THEREFOR

The invention relates to a method for producing a removal of material on a tooth end edge of a workpiece toothing with a rotationally driven chamfering tool in a machining operation brought about by controlled axial machine movements between the chamfering tool and the likewise rotationally driven workpiece toothing, as well as to a device suitable for carrying out the method.

Such methods for producing a removal of material on the tooth end edges of toothings with a chamfering tool are known. There occur so-called "chamfers" in which the sharp tooth end edge of, for example, hobbed toothings is transformed by means of supplementary tooth machining, for diverse reasons likely to be familiar to a person skilled in the art, for example, due to the risk of injury when the workpieces are being handled, wear on finishing tools in later finishing, or even the risk of edges that overtake during the case hardening and thus become brittle, which could break off when there is an elevated edge load on the transmission. The chamfer is then produced in soft machining, i.e., before the workpieces are hardened. In addition, the chamfer is formed in a region of the toothing flanks that lies outside of the tooth flank regions that are considered for load-bearing capacity.

Chamfering technology with so-called deburring by hobbing is currently widely used. Here, the edges are formed in a plastic manner into the chamfer by pressing by means of hobbing deburring wheels. The accompanying material displacements lead to an accumulation of material on the tooth flanks as well as axial secondary burrs on the end edges, which can be removed by appropriate measures. Such systems are described, for example, in EP 1 279 127 A1.

Another increasingly popular chamfering technique is chamfering by cutting with suitable cutting tools, for example, fly milling cutters or the "chamfer cutter" disclosed in EP 1 495 824 B1. There are two variants proposed in the art: one is arranging the cutting chamfering tool on the same tool spindle as the hob cutter being used to produce the toothing (EP 1 495 824 B1), as well as separately from the hob cutter (DE 10 2009 019 433 A1 or DE 10 2013 015 240 A1).

The invention addresses the problem of improving a method of the aforementioned type, in particular with respect to easiest possible manner of achieving favorable machining quality of the chamfer produced.

From a method-oriented point of view, this problem is solved by the invention through a further development of the method of the kind described above, which is substantially characterized in that material is removed with a geometrically undefined cutting edge, and the removal takes place in a coordinated action between a profiling, in particular, an alterable profiling, of the chamfering tool and an axial machine control used for the machining operation, performed in dependence on predetermined parameters that are characteristic of the removal of material to be produced.

It has thus been recognized within the scope of the present invention that chamfers with predetermined parameters can be produced to match these parameters by performing, in accordance therewith, a coordinated action between profiling of the chamfering tool with a geometrically undefined cutting edge, and the axial machine control performed for the machining operation. The chamfer thus does not occur of random shape as a result of the tool used and the machining operation performed, but rather, conversely, the profiling of the tool and the axial machine control are set in the mutual coordinated action thereof to the predetermined chamfer parameters. Though a result of designing the chamfering tools with a geometrically undefined cutting edge is indeed that such chamfer times as with "chamfer cutters" cannot be fully met, the chamfer surface does have a higher surface quality. In the especially preferably performed alterable profiling of the chamfering tool, higher flexibility is also achieved, because in the altering of the parameters characterizing the chamfer, e.g., with another workpiece batch, the retuning dependent thereon no longer leads to construction of a new chamfering tool overall, but rather the retuning can be implemented by reprofiling the already-existing chamfering tool.

In the coordinate action between the profiling of the chamfering tool and the axial machine control, it is taken into account that, for example, with a helical tool, a part of the tool profile angle contributes to forming a chamfer angle, in accordance with the so-called "hobbing offset angle" (the workpiece center relative to the front plane of the workpiece being axially offset with respect to the workpiece axis), in addition to the riser height of the tool and the pivot angle of the tool axis about the axial spacing direction, wherein this contribution depends on a tangential displacement of the tool. It is also taken into account that displacement of the operation point tangentially away from the machine center also affects the chamfer angle.

In an especially preferred embodiment, the machining operation is a skiving machining operation, and the chamfering tool is, in particular, helical in shape. Thus, for example, a grinding worm having, in particular, corundum may be used as an abrasive. The screw length is preferably determined by four turns or fewer, in particular, three turns or fewer.

Another embodiment provides that the coordinate action comprises dressing that alters the profile of the chamfering tool. This may be used, as already described above, when there is a workpiece batch change. The dressing could be realized by a profile dressing, which is practical, in particular, with large workpiece batches. This makes it possible to perform reprofiling after the chamfering tool has been worn out after a suitable number of machined workpieces. In another preferred embodiment, shape dressing is used. This increases still further the flexibility of the method, because when the dressing device is arranged appropriately on the chamfering unit, it is no longer necessary to change tools even when the predetermined chamfer parameters are changed.

In another preferred embodiment, the control parameters of the axial machine control are at least partially recalculated in a manner at least partially overlapping in time with the dressing. The machining time in the chamfer process can thus be further reduced.

It would be conceivable to produce the chamfers on the right and left flanks of a tooth gap in simultaneous machining operations (a two-flank method). Preferably, however, the single-flank method is used. In particular, for that purpose it is provided that the chamfering tool is a first chamfering tool, and the removal of material produced therewith is a first removal of material on one flank of a tooth gap, and that a second removal, characterized by, in particular, different parameters is produced on the other flank of the tooth gap with a second chamfering tool that is, in particular, different from the first chamfering tool. This increases still further the flexibility of the method, because the chamfers can be more varied (at the expense of machining time) with fewer constraints determined by the process. This is especially advantageous with workpieces that are helically toothed.

In this context, it may be provided that each of the two chamfering tools receives its own rotary drive. A particular preferred embodiment, however, provides that the two chamfering tools are driven by the same drive. This simplifies the setup of a chamfering device that carries out the method.

It is provided that the parameters characterizing the chamfer contain a predetermined shape for the first and/or second removal. Thus, the chamfer may be designed in plan view of the shape of a comma, where the tooth base does not receive a chamfer (ZKO for if same is selected on both flanks of a tooth), or the chamfers are introduced as far as the tooth base (ZKM with two-flank such viewing). Consideration may also, however, be given to designing the chamfer in plan view at least parallel and at most approximately comma-shaped, wherein here the chamfer preferably extends into the tooth base (ZPM). The second or third of the aforementioned alternatives is then preferred. Other parameters characterizing the chamfer may be the chamfering angle (or chamfer angle, i.e., the angle between a tangent to the chamfer in a plane to the ground circle at the point of the, for example, upper end section plane of the toothing and a parallel to the toothing axis through this point) with optionally different chamfering angles for the sharp edge and the blunt edge for helical toothings, as well as a measure of the removal of material and also the chamfer width. This last one could be predetermined as a function of the tooth height, or also at individual points, for example, at the tooth tip and at the tooth base. It is also provided that for one or more of the chamfer parameters, exact numerical specifications are not predetermined, but rather boundary conditions, for example, allowable tolerance fields in which the parameter can move. It is thus possible with the method according to the invention to precisely produce chamfers in desired and very specifically defined shapes.

From a device-oriented point of view, the problem is solved by a device for producing a removal of material on a tooth end edge of a workpiece toothing, the device comprising a rotationally driven workpiece spindle for mounting a workpiece bearing the workpiece toothing, a rotationally driven chamfering tool that brings about the removal of material in machining operation with the workpiece toothing, and a control device by which controlled axial machine movements bring about the machining operation, the device being substantially characterized in that the chamfering tool removes material with a geometrically undefined cutting edge, and has a profiling, in particular, an alterable profiling, and the control device operates the axial machine movements performed for the removal of material in a coordinated action with the profiling of the chamfering tool that is performed in accordance with predetermined parameters characterizing the removal of material to be produced.

The advantages of the device according to the invention are apparent from the above description of the method according to the invention.

With regard to the machine axes, it is provided that the device has at least two, preferably at least three, in particular, at least four machine axes for settling the relative position between the chamfering tool and the workpiece toothing, which can be controlled independently of one another, and which comprise at least one radial axis that alters the axial distance between the axis of rotation of the workpiece toothing and an axis of rotation of the chamfering tool, and an axial axis having at least one direction component parallel to the axis of rotation of the workpiece toothing. This allows for high flexibility in the adjustability of the machining operation. It is especially preferable to arrange one—preferably, a plurality—of these positioning axes on the workpiece side. This allows for movement of the tool not only toward the workpiece, but also to a position in which the tool can be profiled or reprofiled.

In particular, it may be provided that the axial machine control is designed to hit at least two, more than two, or all of the following machining positions: machining operation of a first tool for single-flank machining on one end face of the workpiece toothing, machining operation of the other chamfering tool with the other tooth edge on this end face of the workpiece toothing, machining operation of the (first) chamfering tool on the one tooth flank on the other end face of the workpiece, and machining operation of the second chamfering tool on the other tooth flank on the other end face of the workpiece toothing.

This aspect is also considered advantageous from the invention entirely independently of the type of production of the chamfer. The invention thus also discloses—as independently deserving of protection—a method for producing a chamfer on left and right flanks of two end faces of a toothed workpiece by removal of material by cutting, wherein all four chamfers are formed in chronological succession by a single-flank process, and the chamfers on the tooth end edges of the same end face differ with respect to chamfer parameters thereof and are formed with different chamfering tools, wherein chamfering tools having a geometrically undefined cutting edge are preferred.

In this context, it has proven advantageous when the first chamfering tool and the second chamfering tool have one common axis of rotation that can be pivoted about an axis, a section of which lies between the two chamfering tools with the common axis of rotation as seen in projection onto a plane that contains the common axis of rotation and runs orthogonal to the pivot axis of the common axis of rotation. This design is also advantageous within the scope of the present invention irrespective of the type of chamfering tools used.

The device, in another preferred embodiment thereof, is equipped with a dressing device that is for dressing the chamfering tool (or the chamfering tools) and is preferably arranged such that a dressing operation between a dresser of the dressing device and the chamfering tool can be achieved without the need to alter the clamping of the chamfering tool via axial machine movement of the device.

In a further preferred embodiment with regard thereto, two further machining positions may be hit on the workpiece side, namely, a dressing position in which the first chamfering tool is dressed, and another dressing position in which the second chamfering tool is dressed.

As has already been indicated, the preferably-provided second chamfering tool is preferably provided with an axis of rotation that is arranged parallel, in particular, coaxial to the axis of the first chamfering tool, and, in particular, one common drive may be provided for both chamfering tools.

If the machining times are to be still further reduced, another conceivable variant would be one where the device allows for overlapping in time of a machining operation of one of the chamfering tools of the workpiece toothing and a dressing operation of the other chamfering tool with the dresser. In this design, the dressing device could have its own axes of positioning movement.

The chamfering device could be integrated into a toothing machine designed to produce the workpiece toothings, or into a composite in which this toothing machine has been incorporated. It could also be installed on the toothing machine. Another embodiment may provide that the chamfering device is configured as a completely independent chamfering machine.

The concept according to the invention can be used both for internally-toothed and externally-toothed workpieces. With internally-toothed workpieces, it may be provided that the device is placed within same.

The preferably-provided integration of a dressing device has already been described above; another conceivable alternative would be for the dressing of the dressable chamfering tools to occur outside of the chamfering device.

An automatic tool changer may be provided so as to be coupled to the chamfering device. The chamfering process itself may be performed with or without cooling lubricant, wherein chamfering with air may also be considered.

The axial machine control also allows for abrasive chamfering with the direction of rotation of the chamfering tool, in particular, the chamfer screw, from the end face out into the tooth flank or vice versa.

The invention also discloses, as deserving of protection, an assembly comprising a mandrel that defines an axis of rotation and is provided in order to receive a machining head of a toothing machine, and that bears a chamfering tool having a geometrically undefined cutting edge that is designed in order to produce a chamfer on a tooth end edge of a workpiece toothing and is designed, in particular, to be helical in shape, wherein the mandrel furthermore comprises one or more toothing tools for toothing machining of the workpieces of the toothing, in particular, a hob cutter for producing the workpiece toothing.

Other features, details, and advantages of the invention arise from the following description with reference to the accompanying drawings, in which:

FIG. 1 illustrates a chamfering device in a perspective view;

FIG. 2 schematically illustrates the machining operations on a right flank (FIG. 2A) and left flank (2B) of a workpiece toothing;

FIG. 3 illustrates a view of a dressing operation between a dressing roller and a chamfer screw; and FIG. 4 illustrates an explanatory sectional view of the assigning of operation regions of the dresser, the chamfer screw, and the workpiece toothing.

FIG. 1 depicts a perspective view of a chamfering machine 100. The machine 100 bears, on one side of a machine bed 1 thereof, a workpiece spindle 8 on which a workpiece W—which, in this embodiment, is helically toothed—is clamped. Provided on the opposite, workpiece-side side of the machine bed 1 is a radial slide 2, which is plate-shaped in this embodiment and via an axis of movement X of which the axial distance between the workpiece axis—designated axially with $W_2$—and the tool axis can be set, wherein the workpiece axis of rotation is designated as a machine axis of rotation with C and the tool axis of rotation is designated as a machine axis of rotation with B1. The radial slide 2 has set thereon a transverse slide 3, which has a tower-shaped design in the present embodiment and an axis of movement Y that runs transversely—in this embodiment, orthogonally—to the radial axis X. The slides 2 and 3 thus form a cross-slide assembly.

A lifting slide 4, an axis of movement Z of which has a component in the direction of the workpiece axis $W_2$ and, in this embodiment, runs parallel thereto is arranged on the side of the transverse slide 3 that faces the workpiece W. The lifting slide 4, in turn, has arranged thereon a tool head 5 equipped with a drive that, in this embodiment, is designed as a direct drive, i.e., with another rotary degree of rotational freedom A. The axis of rotation A is provided so as to be parallel to the radial infeed axis X in this embodiment.

The tool head 5 is designed such that a chamfering tool 6a, 6b, which removes material with a geometrically undefined cutting edge and is rotationally driven here by the direct drive, is arranged on the left and right side with respect to the extension seen along the radial axis X. The chamfering tools 6a, 6b are made in the form of dressable grinding worms.

As is better shown in FIG. 2, the two dressing worms 6a, and 6b are each provided for single-flank grinding. Thus, the chamfering screw 6a on the tooth end edge of the right flanks (blunt edge) of the helical toothing produces the desired chamfer shape (see FIG. 2a), whereas the other chamfer screw 6b is provided in order to produce the chamfers on the tooth end edges of the left flanks (sharp edge) of the workpiece (see FIG. 2b).

With work being done on the blunt edges (FIG. 2a), a pivot angle $A_A$ (=90°-A in FIG. 2A) of, in this embodiment, more than 20° incline is set via the axial machine control. The machining is also performed eccentrically; here, the site of machining is offset by at least one tooth gap width relative to a parallel, going through the workpiece axis $W_2$, to the radial axis X in the tangential direction Y.

Ideally, the shadow casting of the opposing flank on the tooth flank to be machined is used for viewing the maximum eccentricity of the tool operation point and the maximum rotation of the tooth flank to be machined out from the machine center in order to produce a maximum chamfer angle on a tooth flank in such a manner that only just no shadow is cast by the opposing flank on the tooth flank to be machined, wherein the direction of the light in order to produce the cast shadow runs parallel to the radial axis of the machine.

With abrasive chamfering of the sharp edge (FIG. 2B), however, a pivot angle $A_B$ (=90°-A in FIG. 2B) of less than 12° is set, preferably less than 8°, in particular, less than 4°. In particular, the tool axis of rotation (with a vertical workpiece axis W1) may run almost horizontally. It is also provided with this machining that the chamfer screw 6b works almost centrically, with a tangential offset of—in this embodiment—less than one tooth gap width.

As is can be seen further in FIG. 1, a dressing device 12, which is depicted schematically in FIG. 3, is arranged between the workpiece spindle 8 and the tool side. The dressing device 12 in this embodiment has a dressing roller 13, which can rotate about an axis of rotation B2 that is provided, for example, parallel to the axis of movement Z. The workpiece-side axes of movement X, Y, Z and A can be used to bring a chamfer screw into a dressing operation with the dressing roller 13.

Though not depicted in the drawings, two dressing rollers 13a, 13b are also provided in this embodiment, one of which is provided for dressing the chamfer screw 6a provided for the blunt edge and one of which is provided for the chamfer screw 6b provided for the sharp edge. The respectively mating regions are depicted in FIG. 4, in which, as seen in the section, the shape of the chamfer on the sharp edge is depicted bottom left and the shape of the chamfer on the blunt edge is depicted bottom right, in each case with a section on the toothing, whereas the upper section of FIG. 4 depicts the profile-producing profile of the respective dressing rollers in a section through the chamfer screw.

Instead of or in addition to the profile-dressing dressing rollers, however, the dressing device could also be designed for shape dressing. When non-dressable grinding worms are used as chamfering tools, the dressing unit 12 may also be forgone, or still provided in order to for the machine to still offer the options of both dressable and non-dressable grinding tools to be chamfered.

A chamfering operation with the chamfering machine 100, then, proceeds by way of example as follows:

First, the toothing data on the workpiece to be provided with a chamfer is determined, including the parameters characterizing the chamfer. Examples of such chamfering characterizations are the shape of the chamfer, for example, ZKM, the chamfer angle, and the chamfer width, wherein, for example, the distance of the new oblique edge formed by the chamfer from the tooth end surface as measured at the orthogonal to the tooth end surface may be used as the chamfer width. The chamfer extends to the foot region and is, for example, comma-shaped. An alternative chamfer shape that would also be conceivable is, for example, a chamfer that tapers in the direction of the foot region of the tooth gap, but disappears before the foot region.

The process design with the tool design, i.e., in this case, the determination of the profile for the chamfer screws 6a, 6b is now done in accordance with this toothing and chamfer data in a coordinated action with the axial machine controls provided for the process for the respective machining operation of the chamfer screws 6a, 6b, taking into account the above-mentioned influences.

Provided that only individual workpieces having one chamfer are provided, the profile of the chamfer screws could be produced for that purpose, for example, separately outside of the machine by shape dressing. If, however, larger workpiece batches are to be machined, the chamfer screws would need to be reprofiled after a number of, for example, 50 to 100 chamfer processes. In this case, the above-described dressing rollers are preferably fabricated according to the tool design made.

In the process itself, then, the tool axes are delivered by the machine control according to the process design made, thus bringing the chamfer screws 6a, 6b successively in a single-flank machining operation with the workpiece.

The work then preferably follows the work sequence below: First, a chamfer is made with the chamfer screw 6a on the blunt edge on the upper side of the workpiece W facing the viewer in FIG. 1. Then, the chamfer screw 6a is removed from use, and instead the chamfer screw 6b is brought into engagement with the sharp edge at the upper side of the workpiece.

After the chamfers on the upper side have been produced, the chamfers on the underside of the workpiece facing away from the viewer in FIG. 1 are produced accordingly. For this purpose, the tool head 5 is rotated relative to the machining on the upper side by 180°, so that, in turn, the correct relation of operation conditions between the chamfer screws 6a, 6b and the blunt edge/sharp edge of the helical toothing is restored.

It would also be possible to alter this design. Thus, first, the chamfer screw 6a could work first on the upper side and then on the underside, and the chamfer screw 6b could then be used, as one example.

The machining operation itself is a skiving machining operation, in which the chamfer screws 6a, 6b and the workpiece W rotate relative to one another in a synchronized manner. This is preferably achieved by CNC axial machine control, which controls both the workpiece and tool axes of rotation C, B1.

After a number of iterations of machining, the tool head 5 is pivoted into a dressing position.

If, now that a workpiece batch has been machined, a second batch of workpieces that has different chamfer parameters from those of the first batch is to be chamfered, which leads to another tool design, same may be initiated by exchanging the dressing rollers 13 that are designed for the profiling according to the new chamfer parameters. With the new dressing rollers 13', the chamfer screws 6a, 6b can now be reprofiled before machining is started, so that no tool change needs to be done on the tool head 5 despite there being a batch change.

If, however, the difference in the chamfer parameters is sufficiently small to be able to continue without changing the profile of the dressing worms, then the coordinated action is performed by altering the axial machine controls, and the dressing worm experiences additional movements reflecting this coordinated action with respect to the previous axial machine movements.

The invention is not limited to the specific embodiments described in the examples above. Rather, the individual features of the description above and of the claims below may be essential for implementing the invention in the embodiments thereof.

The invention claimed is:

1. A method for producing a chamfer by removal of material on a tooth end edge of a workpiece toothing (W) with a rotationally driven chamfering tool (6a, 6b) in a machining operation brought about by controlled axial machine movements between the chamfering tool and the likewise rotationally driven workpiece toothing,
    characterized in that material is removed with a geometrically undefined cutting edge, and the removal takes place in a coordinated action between a profiling of the chamfering tool and an axial machine control used for the machining operation, performed in dependence on predetermined parameters that are characteristic of the chamfer to be produced,
    wherein the chamfering tool is a first chamfering tool (6a), and the chamfer produced therewith is a first chamfer on a flank of a tooth gap, and wherein a second chamfer, characterized by different parameters is produced on the other flank of the tooth gap with a second chamfering tool (6b) that is different from the first chamfering tool.

2. The method according to claim 1, wherein the machining operation is a skiving machining operation, and the chamfering tool is helical in shape.

3. The method according to claim 1 wherein the coordinate action comprises dressing that alters the profile of the chamfering tool.

4. The method according to claim 3, wherein the control parameters of the axial machine control are at least partially recalculated in a manner at least partially overlapping in time with the dressing.

5. The method according to claim 1, wherein the first and second chamfers are produced in chronological succession.

6. The method according to claim 1, wherein both the chamfering tools are driven by the same drive.

7. The method according to claim 1 wherein the characterizing parameters for the first and/or second chamfers contain a predetermined shape.

8. The method according to claim 1 wherein the characterizing parameters of the first and/or second chamfers contain one or more boundary conditions for the first and/or second chamfers.

9. The method of claim 1 wherein said profiling comprises an alterable profiling.

\* \* \* \* \*